F. N. ADAMS.
AUTOMATIC CORN PLANTER.
APPLICATION FILED MAY 18, 1908.
914,373.
Patented Mar. 9, 1909.
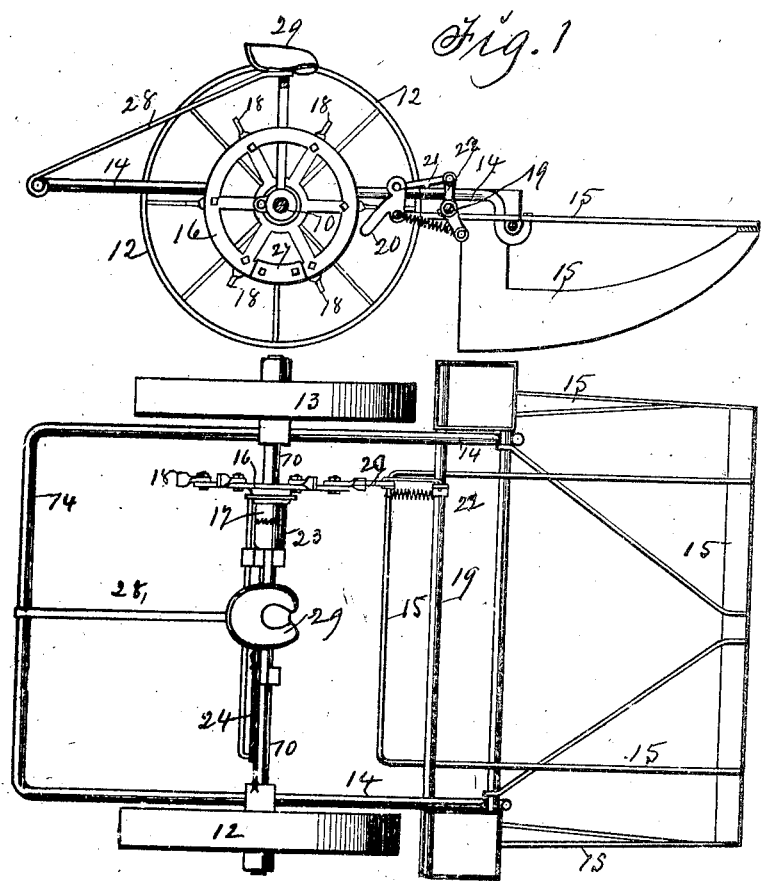
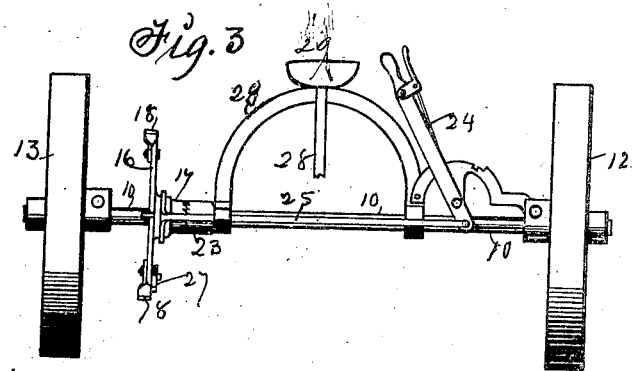
Witnesses: Inventor: Frederic N. Adams.
By Thomas G. Orwig and Geo. Attys.

UNITED STATES PATENT OFFICE.

FREDERIC N. ADAMS, OF AFTON, IOWA.

AUTOMATIC CORN-PLANTER.

No. 914,273.

Specification of Letters Patent.

Patented March 9, 1909.

Application filed May 18, 1908. Serial No. 434,175.

*To all whom it may concern:*

Be it known that I, FREDERIC N. ADAMS, a citizen of the United States, residing at Afton, in the county of Union and State of Iowa, have invented a new and useful Automatic Corn-Planter, of which the following is a specification.

The object of my invention is, first, to provide simple, cheap and efficient means to automatically drop seeds at regular intervals in the field as the planter is advanced in such a manner as to produce check rows; second, to automatically adjust the seed dropping mechanism in turning about at the end of a field as required to start even with the rows that have been planted.

My invention consists in the construction, arrangement and sub-combinations of elements as hereinafter set forth, pointed out in my claims and illustrated in the accompanying drawings, in which:

Figure 1 is a side view of the mechanism relative to the carriage. Fig. 2 is a plan view that shows the construction and arrangement of the operative parts relative to the carriage. Fig. 3 is a rear end view of the planter that shows the position of clutch operating mechanism relative to the carriage axle and the driver's seat.

The numeral 10 designates the carriage axle and 12 and 13 are fixed wheels on the ends of the axle. The axle is a rigid carriage frame 14 and connected with the front of the carriage frame is a front or runner frame mounted on runners 15.

A rotatable wheel 16 is loosely mounted on the axle 10 and has a clutch member 17 on the inner end of its hub. It also has radial projections 18 at its periphery, equal distances apart, that adapt the wheel to serve as a cam wheel to impart motion at regular intervals, at each revolution of the axle 10, to a rock-shaft 19 mounted on the runner frame in the front of the carriage frame 14, as shown, or in any suitable way, in such a manner that the projections 18 will successively impinge upon a spring-actuated lever 20 pivotally connected with a rock shaft 19 mounted on the runner frame to impart intermittent motion to the rock shaft and seed valves in the seed boxes not shown. The lever 20 is connected with the rock shaft 19 by means of a link 21 and a crank 22 on the rock shaft as shown.

A clutch member 23 is fixed on the axle 10 and a hand lever 24 is mounted on the frame 14 and connected with the clutch 23 on the hub of the wheel 16 and a rod 25 is connected with the short arm of the lever 24 and with the hub of the wheel 16 in such a manner that the wheel 16 can be readily moved on the axle 10 as required to be rotated by a weight 27 on the periphery of the wheel in such a manner that it will, by force of gravity, bring one of the projections 18 close to the lever 20 and by such automatic action, in turning about at the end of a row the machine will be properly adjusted so that in the return trip the operator on the seat need only pull the hand lever 24 to start the rows to be planted even with those previously planted.

An arched frame 28 is fixed on the axle 10 to support a seat 29 in proper position to allow an operator on the seat to take hold of the lever 24 as required to actuate the clutch member 17 in turning about at the end of a field, or whenever it may be necessary as required to keep the check rows in line and regular distances apart.

It is obvious the radial projections or cams 18 can be changed in number and in distances apart on the wheel 16 as required for planting seeds in rows at different spaces apart at different times as may be desired.

Having thus set forth the purposes of my invention and the construction and arrangement of the different parts the practical operation and utility thereof will be obvious.

What I claim as new and desire to secure by Letters-Patent, is:

1. In a corn planter an operating wheel, a wheel mounted loosely on the carriage axle and provided with radial projections at equal distances apart, a weight attached to the circumference of said wheel, a clutch member fixed on the hub of the wheel, a clutch member fixed on the axle, means to slide the wheel on the axle and seed dropping mechanism arranged and combined for adjustment in the manner set forth.

2. In a corn planter an operating wheel, a wheel mounted loosely on the carriage axle and provided with radial projections and a weight at its circumference, a clutch member fixed on the hub of the wheel, a clutch member fixed on the axle, means to slide the wheel on the axle for engaging the two
5 clutch members, a runner frame, a rock shaft mounted on the runner frame and a spring-actuated lever to transmit intermittent motion from the wheel on the carriage axle to the rock shaft and seed dropping mechanism, all arranged and combined substantially as set forth. 10

FREDERIC N. ADAMS.

Witnesses:
B. A. LARIMER,
W. C. INGHAM.